United States Patent [19]

Petit et al.

[11] 4,373,908
[45] Feb. 15, 1983

[54] KILN SHELL NOZZLE WITH ANNULAR FLUID DELIVERY

[75] Inventors: Peter J. Petit, Milwaukee; Walter J. Hartwig, Watertown, both of Wis.

[73] Assignee: Allis-Chalmers Corporation, Milwaukee, Wis.

[21] Appl. No.: 323,896

[22] Filed: Nov. 23, 1981

[51] Int. Cl.³ .................... F27B 7/36; F27B 7/06; F02M 45/00; C21B 11/06
[52] U.S. Cl. .................... 432/109; 34/241; 239/553.5; 266/173; 432/113
[58] Field of Search .......... 432/103, 109, 113; 34/130, 241; 239/553.5; 266/173, 187, 266; 110/182.5

[56] References Cited

U.S. PATENT DOCUMENTS

| | | | |
|---|---|---|---|
| 1,216,667 | 2/1917 | Downs | 432/109 |
| 2,091,850 | 8/1937 | Gohre | 432/109 |
| 3,182,980 | 5/1965 | Helfrich | 432/109 |
| 3,404,845 | 10/1968 | Schmeling et al. | 239/553.5 |
| 3,511,631 | 5/1970 | Chaumont | 110/182.5 |
| 3,794,483 | 2/1974 | Rossi | 432/109 |
| 3,847,538 | 11/1974 | Rossi | 432/113 |
| 3,946,949 | 3/1976 | Rossi | 266/265 |
| 4,070,149 | 1/1978 | Rossi | 432/109 |
| 4,214,707 | 7/1980 | Flaherty | 239/553.5 |

*Primary Examiner*—John J. Camby
*Attorney, Agent, or Firm*—Timothy R. Conrad

[57] ABSTRACT

A port assembly for delivering fluid through a shell of a horizontal rotating reactor, such as a rotary kiln, is disclosed for purging from the port particulate material which enters port piping when no fluid is passing through the port. The port assembly comprises a cylindrical nozzle disposed in a port pipe, or port sleeve. The nozzle defines a nozzle orifice for discharging fluid into the reactor. A base member having a sloping surface is provided adjacent the nozzle with the sloping surface and nozzle cooperating to define a fluid distribution cavity with a thickness constantly varying from its circumference toward its center. The base member is sized as to define a fluid supply passage with facing surfaces of the port sleeve. Rest tabs along the circumference of the base member separate the base member from the nozzle while permitting communication between the fluid supply passage and fluid distribution cavity. A sealing ring is provided between the nozzle and base member and engages the port sleeve in sealing contact. Particulate material within the sleeve accumulates within the fluid supply passage and rests against the sealing ring as the port rotates with the reactor. Fluid under pressure purges the port by flowing through the fluid supply passage and diverts into the fluid distribution cavity. The flow entrains the particulate matter and carries it into the cavity for discharge from the port.

2 Claims, 4 Drawing Figures

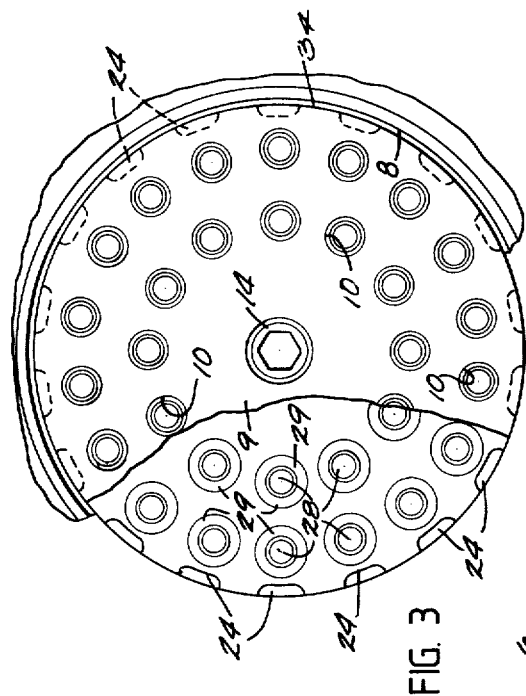
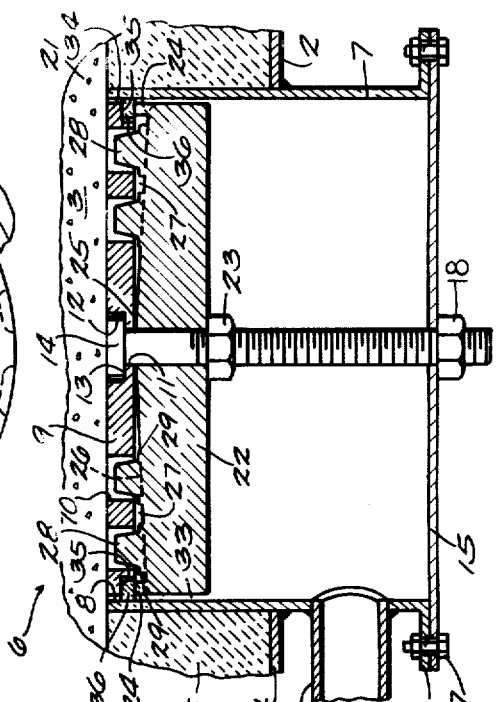
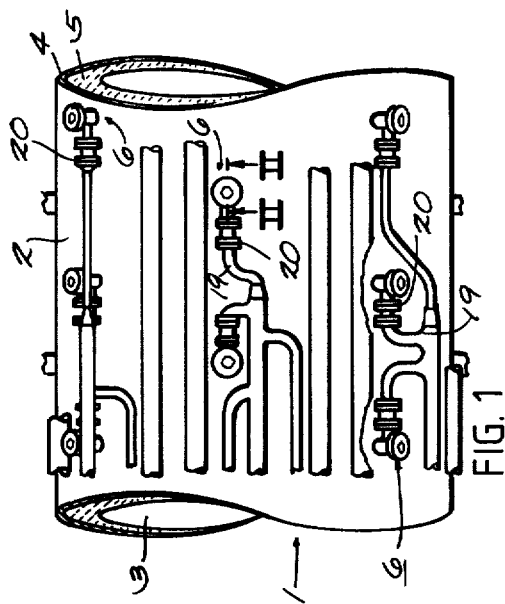
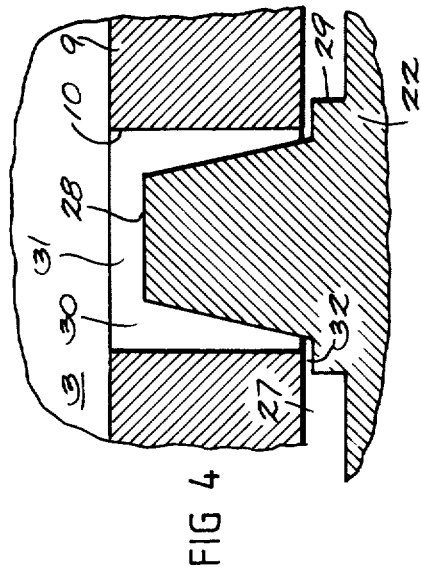

KILN SHELL NOZZLE WITH ANNULAR FLUID DELIVERY

CROSS REFERENCE TO RELATED PATENT APPLICATION

This application discloses a port for delivering fluid to a horizontal rotating reactor, such as a rotary kiln, which is the subject of copending and commonly assigned U.S. patent application entitled "Gas Injecting Kiln Shell Nozzle with Particle Entry Barriers" of Peter J. Petit and Thomas J. Gill, filed concurrently with this application.

BACKGROUND OF THE INVENTION

1. Field of the Invention

This invention relates to rotary kilns for the treatment of a tumbling bed of mixed-size pulverulent material and particularly to ports in the kiln shell for discharging gases such as fuel, steam and/or air to the interior of a rotary kiln wherein the port is self-purging of the pulverulent material.

2. Description of the Prior Art

In the prior art, rotary kilns are known wherein a plurality of ports are provided through the shell of the kiln to admit air and fuel into the interior of the kiln. Examples of such prior art kiln are disclosed in U.S. Pat. Nos. 1,216,667; 2,091,850 and 3,182,980. Nozzles for such kilns are disclosed in U.S. Pat. Nos. 3,794,483; 3,946,949 and 4,214,707. Mechanisms for operating such nozzles are disclosed in U.S. Pat. Nos. 3,847,538 and 4,070,149.

In certain of the prior art, e.g., U.S. Pat. Nos. 1,216,667 and 2,091,850 kiln fuel and/or air is injected into the kiln through ports while the ports are below the material charge of the bed. In the other of the aforesaid prior patents, air and such, as a fuel gas, is injected alternately with the fuel gas being injected when the ports are beneath the bed of the material charge and air being injected when the ports are over the bed. With the aforesaid apparatus operated to process mixed size materials, the smaller particles may enter the ports and associated piping impairing the flow of fluid through the ports and eventually causing complete clogging of the ports, rendering it useless for under bed fluid injection.

Additionally, while such rotary kilns may have as many as 600 nozzles, commonly five or more of the nozzles are activated by a single valve. Consequently, if material particles enter the associated piping through any one port and damage a valve, numerous ports will become inoperative. This is particularly troublesome where a port is normally inactive and makes numerous passes beneath a bed of material with no gas passing through the port or associated piping. Thus, when a port or number of ports become useless by reason of being plugged or damaged to an associated control valve, the capacity of the kiln is reduced and its operational time span between maintenance periods is reduced.

Ports have been proposed which prevent particulate material from entering port piping. U.S. Pat. No. 4,214,707 to Flaherty dated July 19, 1980 discloses a self-purging port for a rotary kiln. In the Flaherty patent, the port has a nozzle having a plurality of orifices for passing fluid to the interior of a kiln. Behind the nozzle is a labyrinth trap. Particulates from the kiln are allowed to pass through the nozzle orifices into the trap as the port passes beneath material in the kiln. A plurality of orifices in the trap causes fluid to swirl as the fluid passes through the trap on its way to the interior of the kiln. This swirling causes the fluid to pick up the particulates in the trap and carry them into the kiln.

The aforementioned copending and commonly assigned patent application of Peter J. Petit and Thomas J. Gill, filed concurrently herewith, discloses a port comprising a nozzle and a base member cooperating to define a particle screening mechanism to prevent particles from entering the port pipe, or port sleeve.

While the above-mentioned ports act to prevent particulate material from entering the associated port pipe, some of the very smallest particulate material will eventually elude the aforementioned screening mechanisms and pass into piping. Even the smallest amount of material, however, is potentially damaging to valves which regulate the ports.

It is a general object of the present invention to provide a further improved port construction, which purges particulate material, which may pass the port screening mechanism and enter the port piping.

SUMMARY OF THE INVENTION

According to a preferred embodiment of the present invention, there is provided a port assembly secured within a port pipe, or port sleeve, and positioned for communication with the interior of a rotary kiln. The port assembly comprises a cylindrical nozzle with a base member adjacent one side thereof. Facing surfaces of the nozzle and base member cooperate to define a fluid distribution cavity between the nozzle and base member. Means, forming no part of this invention, are provided between the fluid distribution cavity and the surface of the nozzle remote from the base member for screening particulate matter from the fluid distribution cavity.

The surface of the base member facing the nozzle slopes from its circumference toward its center so the fluid distribution cavity has a constantly decreasing thickness from its circumference toward its center. The base member is spaced from the port sleeve to define a fluid supply passage. The base member is also provided with a plurality of rest tabs circumferentially spaced upon a side of the base member facing the nozzle. The rest tabs extend through the fluid distribution cavity a distance equal to the thickness of the cavity.

The outer circumferential surface of the nozzle adjacent the base member defines a radially and axially extending notch. A sealing ring is secured within the notch between the notch defining surfaces of the nozzle and the base member rest tabs. The sealing ring engages the port sleeve in sealing contact.

In the operation of the port assembly, fluid under pressure flowing through the port sleeve passes through the fluid supply passage surrounding the base member. The sealing ring deflects the flow of fluid to flow between the rest tabs and into the fluid distribution cavity. The varying thickness of the fluid distribution cavity ensures equal distribution of fluid to the various screening mechanisms and ultimate discharge from the nozzle.

When mounted within the shell of a rotary kiln, the port assembly rotates with the kiln making passes both beneath and above a bed of particulate material. During underbed passing, and particularly when no fluid is passing through the port, small particulate material may enter the port sleeve. As the port rotates with the kiln to an overbed position, gravity urges the particulate material within the sleeve into the fluid supply passage surrounding the base member where the material rests against the sealing ring. When in an overbed position, the port may be purged of the material by passing fluid under pressure through the port. The flow of fluid through the fluid supply passage is diverted by the sealing ring into the fluid distribution cavity. Turbulence attendant with the diverted flow entrains the particulate material resting against the sealing ring with the flow carrying the material into the fluid distribution cavity and discharges the material out of the nozzle.

BRIEF DESCRIPTION OF THE DRAWINGS

FIG. 1 is a side view of a portion of a rotary kiln having a plurality of ports in accordance with the invention;

FIG. 2 is a section through a port in the kiln wall taken in a plane represented by the line II—II in FIG. 1;

FIG. 3 is a view of the discharge end of the port structure; and,

FIG. 4 is a view of a base member platform positioned in a nozzle orifice.

DESCRIPTION OF THE PREFERRED EMBODIMENT

A kiln 1 is shown in FIG. 1 as provided with an elongated cylindrical body portion 2 which defines a cylindrical chamber 3. The body portion 2 of the kiln 1 comprises an outer steel shell 4 which is lined with a suitable refractory liner 5, such as fire bricks. Any well known means may be provided for supporting and rotating the kiln 1. Since such means form no part of the present invention, and are well known in the art, they are not shown herein.

A plurality of circumferentially and axially spaced port assemblies 6 are provided about the surface of the kiln opening into the chamber 3. The ports 6 are all similar in construction and operation, and a description of one of said ports will apply to all ports. As shown in FIG. 2, the port 6 comprises a cylindrical steel sleeve or port pipe 7 which is fixed within a suitable opening 8 formed in the wall of the kiln shell 2. Within the sleeve 7, a nozzle 9 is supported to effect a desired positioning of the nozzle interface with respect to the inner surface of the pipe 7.

As shown in FIGS. 2 and 3, the port 6 includes a nozzle 9 having a plurality of orifices 10 for directing fluid under pressure into the chamber 3 of the kiln shell 2. The nozzle 9 defines a centrally located bore 11 countersunk as at 12 to further define an annular surface 13 which receives a head portion of a bolt 14. At its opposite or outer end, the bolt 14 extends outwardly of the port sleeve 7 and a closure cap 15. Cap 15 is secured to a flange 16 on sleeve 7 by bolts 17 and a nut 18 is turned on end of bolt 14 projecting through cap 15.

As shown in FIGS. 1 and 2, fluid is supplied selectively to the ports 6 by supply pipes 19 connected into port assemblies 6 and to a source of fluid (not shown). As shown in FIG. 1, valve means 20 are shown associated with each port 6. It will be appreciated, while individual valve means 20 are shown associated with each port 6, a single valve 20 could be associated with a plurality of ports 6.

As the kiln 1 rotates, each valve 20 may be opened, as its associated ports 6 rotate under a bed of material 21 within the kiln chamber 3, and each valve may be closed prior to such ports emerging from beneath the bed of material, in a manner such as disclosed in U.S. Pat. No. 4,070,149. Before the fluid under pressure is turned on to the ports under the material bed, small particles of the material in the bed can enter the orifices 10 of the nozzle 9 and enter the port sleeve 7. To minimize this condition, each port 6 assembly is provided with a base member 22, as shown in FIG. 2, which is clamped against the radially inner surface of the nozzle 9 by a nut 23 turned on a shank portion of bolt 14 between the member 22 and the cap 15.

The base member 22 is constructed to provide a surface 26 facing, but axially spaced from the nozzle 9 by a plurality of circumferentially spaced rest tabs 24 and a radial inner hub 25, with both rest tabs 24 and hub 25 projecting axially away from surface 26 and toward nozzle 9. A fluid distribution cavity 27 is thereby defined between the surface 26, nozzle 9, rest tabs 24 and hub 25. As shown in FIG. 2, surface 26 of base member 22 slopes from its circumference at rest tabs 24 toward hub 25 with fluid distribution cavity 27 having a constantly decreasing thickness from the circumference of cavity 27 to hub 25.

The base member 22, as shown in FIG. 2, is provided with a plurality of platforms 28 and annular shoulders 29 whereby each orifice 10 in nozzle 9 is associated with one platform 28 and one annular shoulder 24. It will be appreciated, while a fixed number of combinations of platforms, orifices and annular shoulders are shown in the drawings as incorporated with port assembly 6, a greater or lesser number of combinations of orifices, platforms and annular shoulders could be embodied within port assembly 6. It will further be appreciated that any one orifice 10 together with its associated platform 28 and annular shoulder 29 constitutes a separate and discrete port which is resistant to plugging and self-flushing (as shall hereinafter be described).

As all combinations of orifice 10, platform 28 and annular shoulder 29 are of similar construction and operation, a description of one shall apply to all such combinations. As shown in FIG. 4, platform 28 projects from base member 22 and extends axially through cavity 27 and into orifice 10 in nozzle 9. The platform 28 is of a diameter less than the diameter of the orifice 10 thereby partially plugging the orifice and cooperating with the nozzle to define an annular chamber 30. The platform is also constructed to be of a cylindrical length less than the axial dimension of the nozzle 9 and the platform terminates with a free end within orifice 10 to define a cylindrical chamber 31 within the orifice 10 in communication with the kiln chamber 3. Cylindrical chamber 31 preferably has an axial dimension equal to one-fifth (and not greater than one-half) the diameter of orifice 10.

The platform 28 is provided with particle barrier means comprising an annular shoulder 29 surrounding the platform 28 at the location of junction between the platform 28 and the base member 22. The shoulder 29 is constructed with a diameter greater than the diameter of the platform 28 and greater than the diameter of the orifice 10 in the nozzle 9. The annular shoulders 29 have an axial dimension less than the axial dimension of the cavity 27 thereby defining between each shoulder 29 and the nozzle 9 a particle barrier gap 32. The radial plane of gap 32 is perpendicular to the axis of annular chamber 30.

As shown in FIG. 2, base member 22 cooperates with sleeve 7 to define an annular fluid supply passage 33. An outer circumferential surface 34 of the nozzle 9 adjacent the base member 22 defines a radial and axially extending notch 35. A sealing ring 36 is provided within notch 35 and secured therein between nozzle 9 and rest tabs 24. Sealing ring 36 engages sleeve 7 in sealing contact preventing communication between annular fluid supply passage 33 and kiln chamber 3.

OPERATION

With the construction of ports 6 described, and particularly as shown in FIG. 2, the fluid which may be oxidizing gas and/or steam under pressure, enters the port 6 through supply pipe 19 and flows through annular fluid supply passage 33. Sealing ring 36 causes the flow to divert with the fluid passing between rest tabs 24 into the fluid distribution cavity 27. The fluid then flows in the radial plane of cavity 27 with the constantly decreasing thickness of cavity 27 from its circumference to hub 25 ensuring an even distribution of the fluid flow to each of the particle trapping gaps 32 defined by the annular shoulder 29 and nozzle 9. The diverted fluid is caused to flow with considerable turbulence because of the several changes in directions of flow as the fluid passes through the annular fluid supply passage 33, cavity 27, through the gaps 32, through the annular chamber 30 and finally into the kiln chamber 3.

While the fluid flows through ports 6 into the kiln 3 in the manner described, particles of the material within the kiln move through the kiln and over the ports 6 along a path which has both axial and transverse components. Particles of the charge material passing over the ports 6 within the kiln are subjected to a three-stage port screening which excludes from the particle trapping gap 32 all but very small sized particles which are most easily flushed out and returned to the kiln by the described turbulent fluid flow through the ports 6. The first stage of the three-stage screening is achieved because particles larger than the diameter of the orifices 10 cannot pass from kiln chamber 3 into the cylindrical chamber 31. Additionally, chamber 31 prevents large particles from impacting with particles that do enter chamber 30 thereby caking the particles. Cylindrical chamber 31, having an axial dimension not greater than one-half the diameter of orifice 10, prevents particles of approximately the same diameter of the orifice from lodging in the chamber 31 by reason of bombardment by the tumbling bed of material. Chamber 30 is protected from plugging by the same mechanism by virtue of its entrance being inaccessible to the bombardment of large particles. Particles small enough to pass into the cylindrical chamber 31 are screened a second time by the much smaller opening into annular chamber 30. Particles small enough to pass into the annular chamber 30 are screened a third time by the still smaller opening of the particle barrier gap 32. Gap 32, having a radial plane perpendicular to annular chamber 30, prevents material from being packed within gap 32 by reason of forces transmitted from the tumbling bed through material which may accumulate in chamber 30 while gases are not flowing through the port. Thus, all but the very smallest size particles are mechanically screened from particle barrier gap 32 while the particles too small to be mechanically excluded are hydraulically excluded by the flushing action of the turbulent fluid flow through particle barrier gap 32.

During the life of the port 6, and particularly during periods of time when the port 6 is permitted to pass beneath the material charge when no fluids are passing through the port 6, certain amounts of small particulate matter will eventually enter the fluid distribution cavity 27, the annular fluid supply passage 33 and the interior of sleeve 7. While the port 6 rotates with kiln shell 2 to a position in overlying relation to material bed 21, particulate material within sleeve 7 will be urged by gravity into annular fluid supply passage 33 to rest against sealing ring 36. When the ports are in this overbed position, they may be purged by passing fluid through the port. The flow of fluid passing from the interior of sleeve 7 through the annular fluid supply passage 33 increases in velocity due to the change in volume through the fluid passages. This increase in velocity, together with the turbulent flow present as the flow is diverted by sealing ring 36 through rest tabs 24 into cavity 27, flushes particulate matter resting against sealing ring 36 into cavity 27 where it is further flushed through particle barrier gap 32 and into kiln chamber 3 as described above.

It will be appreciated while the port of the invention has been described as used with a rotary kiln, it can also be used in connection with horizontal rotating reactors for treating a tumbling bed of mixed-size particulate material such as dryers, coolers or the like.

From the foregoing detailed description of the present invention, it has been shown how the objects of the present invention have been attained in a preferred manner. However, modification and equivalents of the disclosed concepts, such as readily occur to those skilled in the art, are intended to be included in the scope of this invention. Thus, the scope of the invention is intended to be limited only by the scope of the claims such as or may hereafter be, appended hereto.

The embodiments of the invention in which an exclusive property or privilege is claimed are defined as follows:

1. A self-cleaning port assembly for delivering fluid through a shell of a horizontal rotating reactor, such as a generally horizontal rotary kiln, for treating a tumbling bed of mixed-size particulate material; said port assembly having a hollow sleeve adapted for attachment to the reactor shell and with a first end thereof in communication with a chamber within the reactor; a cylindrical nozzle coaxially within said sleeve adjacent said first end of the sleeve; an orifice formed in the nozzle; means for delivering a fluid to said sleeve remote from said first end of said sleeve and said nozzle; a base member in said sleeve between said nozzle and said fluid delivery means with said base member cooperating with the nozzle to define a fluid distribution cavity therebetween; a platform extending from said base member through the fluid distribution cavity and into the nozzle orifice in spaced relation to said nozzle; an annular shoulder abutting said platform and said base member with said annular shoulder projecting away from the platform and away from the base member into the fluid distribution cavity; said annular shoulder, platform and nozzle cooperating to define an orifice fluid passage for permitting passage of fluid from the fluid distribution cavity into the reactor chamber, the improvement comprising:

at least a portion of said base member is spaced from said sleeve to define therebetween a fluid supply passage connecting said fluid delivery means to said fluid distribution cavity; a plurality of rest tabs circumferentially spaced upon a side of the base member adjacent the nozzle; the outer circumferential surface of said nozzle adjacent said base member defines a radial and axially extending notch; a sealing ring within said notch secured between the notch defining surfaces of said nozzle and said base member rest tabs with said sealing ring engaging said sleeve in sealing contact; whereby fluid under pressure passes from said fluid delivery means through the fluid supply passage and is diverted by said sealing ring to pass between said rest tabs into the fluid distribution cavity and into said orifice fluid passage for discharge from the port assembly.

2. A further improvement to a port assembly according to claim 1, wherein said side of the base member adjacent said nozzle slopes from the circumference of the base member toward the center to define with said nozzle a fluid distribution cavity with constantly decreasing thickness from the circumference of the cavity to the center whereby fluid flow throughout the cavity is of constant pressure.

* * * * *